(12) United States Patent
Zhou et al.

(10) Patent No.: US 6,168,775 B1
(45) Date of Patent: Jan. 2, 2001

(54) CATALYST AND PROCESS FOR DIRECT CATALYSTIC PRODUCTION OF HYDROGEN PEROXIDE, ($H_2O_2$)

(75) Inventors: Bing Zhou, Plainsboro; Lap-Keung Lee, Cranbury, both of NJ (US)

(73) Assignee: Hydrocarbon Technologies, Inc., Lawrenceville, NJ (US)

( * ) Notice: Under 35 U.S.C. 154(b), the term of this patent shall be extended for 0 days.

(21) Appl. No.: 09/140,265

(22) Filed: Aug. 26, 1998

(51) Int. Cl.[7] ............... B01J 21/18; B01J 23/38; B01J 23/40; B01J 23/44; C01B 15/01

(52) U.S. Cl. ............ 423/584; 502/185; 502/325; 502/330; 502/339; 502/344

(58) Field of Search ............... 502/325, 339, 502/344, 185, 330; 423/584

(56) References Cited

U.S. PATENT DOCUMENTS

| | | | |
|---|---|---|---|
| 4,476,242 | * 10/1984 | Puskas et al. | 502/185 |
| 4,937,220 | * 6/1990 | Nickols, Jr. | 502/185 |
| 5,061,671 | * 10/1991 | Kitson et al. | 502/185 |
| 5,338,531 | * 8/1994 | Chuang et al. | 423/584 |
| 5,372,981 | * 12/1994 | Witherspoon | 502/185 |
| 5,698,488 | * 12/1997 | Birbara et al. | 502/185 |
| 5,900,386 | * 5/1999 | Freund et al. | 502/185 |
| 5,961,948 | * 10/1999 | Wanngard | 423/584 |

OTHER PUBLICATIONS

WO 98/10863 published Mar. 19, 1998.*

"Shape–Controlled Synthesis of Colloidal Platinum Nanoparticles" by T. Ahmadi et al, *Science*, vol. 272, Jun. 28, 1996, pp. 1924–1926.*

* cited by examiner

*Primary Examiner*—Wayne Langel
(74) *Attorney, Agent, or Firm*—Fred A. Wilson

(57) ABSTRACT

A particulate supported noble metal phase-controlled catalyst material having 5–1000 $\mu$m surface area of $50\mu500$ $m^2$/gm is provided for use in direct catalytic production of hydrogen peroxide ($H_2O_2$) product from hydrogen and oxygen-containing feedstreams. The catalyst is made by depositing phase controlled crystals of a noble metal such as palladium on a suitable particulate support material such as carbon black, by utilizing a precursor solution of the metal and a suitable control ionic polymer having molecular weight of 300–8000 such as sodium polyacrylate in a selected metal to polymer molar ratio of 1:0.1 to 1:10, which procedure provides desired phase control of the noble metal atoms to form widely dispersed minute noble metal crystals on the support material. The invention includes methods for making the catalyst, and also a process for utilizing the catalyst to directly produce high yields of hydrogen peroxide ($H_2O_2$) product from hydrogen and oxygen-containing gaseous feedstreams.

21 Claims, 3 Drawing Sheets

ADSORPTION  ELECTRON TRANSFER  PRODUCT FORMATION $H_2$  $O_2$      $H_2$  $O_2$      $H_2O_2$

2e $H_2$  $O_2$  $H_2$      $H_2$  $O_2$  $H_2$      2 $H_2O$ 2e  2e

SCHEMATIC PRESENTATION OF $H_2/O_2$ REACTION ON PALLADIUM ATOM

CATALYST AND PROCESS FOR DIRECT CATALYSTIC PRODUCTION OF HYDROGEN PEROXIDE, ($H_2O_2$)

BACKGROUND OF INVENTION

This invention pertains to production of hydrogen peroxide ($H_2O_2$) by direct catalytic synthesis using hydrogen and oxygen-containing feedstreams. It pertains particularly to a supported noble metal phase-controlled catalyst having high activity and product selectivity, and which is useful for such direct hydrogen peroxide production process utilizing feedstreams having hydrogen concentration less than about 4% by volume.

Demand for hydrogen peroxide product has been growing globally at about 6% annually, and in North America at about 10% annually. Such demand growth is due primarily to the environmental advantages of hydrogen peroxide usage, which upon decomposition releases only oxygen and water. Hydrogen peroxide is an effective replacement for chlorine in pulp and paper bleaching, water treatment and other environmental processes, and meets the growing product demand and need for a simple environmentally friendly and cost effective process that can be located on-site for the pulp, paper and other manufacturing facilities. The hydrogen peroxide presently being produced commercially uses a known anthraquinone process which has low yields and some safety problems. Also, transportation of hydrogen peroxide from a production site to an end-user facility is an important safety issue due to the risk of explosion of hydrogen peroxide by its violent decomposition.

Many attempts have been made to produce hydrogen peroxide directly from hydrogen and oxygen-containing feedstreams, because such a process not only has potential for significantly reducing the production cost, but also provides an alternative production process which avoids the present use of toxic feedstock and working solutions. For such direct catalytic production of hydrogen peroxide, the feedstreams are hydrogen and air which are clean and environmentally harmless, and no organic solvent is used in such a direct synthesis process. The reaction medium is water, and the hydrogen peroxide formed does not contain any organic compounds. Such direct process generates no waste and is cost efficient due to its inherent simplicity, and the hydrogen peroxide product can be used directly as a bleaching agent in pulp and paper processes. However, such proposed direct production technology has not yet been commercialized, as the major problems for the known processes are (1) hazardous operating conditions (with the feed hydrogen partial pressure above an explosive range), (2) low reaction rates, and (3) low catalytic product selectivity.

Although the direct catalytic synthesis of hydrogen peroxide product has attracted much attention and many patents have been issued, none of the patented processes have been commercially feasible due to low catalyst activity and the low selectivity for the production of hydrogen peroxide. Until the early 1990's, most of these patents utilized as feed gas at least 10% hydrogen in air or oxygen, which is within the explosion limits for the $H_2/O_2$ mixture. Due to increasing safety concerns, the recent approach has been to utilize feedstreams having hydrogen concentration below about 5 vol. %. However, at such low hydrogen concentration, the catalysts used must be much more active to achieve an acceptable production rate of hydrogen peroxide. Highly dispersed palladium on various support materials has been used to enhance the catalytic activity. However, the dispersion methods used have not adequately controlled the crystal phase of the palladium, and desired improvement in selectivity towards hydrogen peroxide product has not been achieved. A main problem in preparing a highly selective catalyst for hydrogen peroxide production is how to consistently control the formation of a desired metal phase such as phase 110 or 220, etc. in the catalyst.

Such known prior attempts to develop a commercial hydrogen peroxide process are described in various patents. For example, U.S. Pat. No. 4,661,337 to Brill discloses producing hydrogen peroxide by decently reacting hydrogen and oxygen at superatmospheric pressure in an acidic aqueous solution containing a suspended catalyst formed of a layer of supported noble metal such as palladium. U.S. Pat. No. 4,681,751 to Gosser discloses a catalytic process for making hydrogen peroxide from hydrogen and oxygen using as catalyst palladium on small carbon support particles in an aqueous medium containing an acid component and halide ion component. U.S. Pat. No. 4,722,458 to Gosser et al. discloses a similar process which used as catalysts Pd alone or a Pd and Pt mixture on various carriers in an aqueous reaction medium containing a bromide promotor. U.S. Pat. No. 4,832,938 to Gosser et al discloses a similar direct hydrogen peroxide production process using platinum/palladium catalysts. U.S Pat. No. 5,236,692 to Nagashima et al discloses a method for producing hydrogen peroxide by directly reacting hydrogen and oxygen in a medium containing a promotor and using a platinum group metal catalyst supported on a solid superacid carrier. U.S. Pat. No. 5,378,450 to Tomita et al. describes a process using a supported tin-modified palladium as catalyst, in a liquid medium containing no halogen ions. U.S. Pat. No. 5,399,334 to Kawakami et al. disclosed a direct hydrogen peroxide process using an aqueous medium containing an organic solvent and as catalyst palladium supported on alumina, silica, or activated carbon for product selectivity between 55% and 82%. Also, U.S. Pat. No. 5,338,531 to K. Chuang et al. disclosed a direct catalytic process using a feed gas containing 3.2 vol. % hydrogen, 10 vol. % nitrogen and 86.8 vol. % oxygen; product selectivity ranged between 38% to 100%, but deceased with increased catalyst age. The catalyst support was hydrophobic fluorinated carbon which is very expensive and has not been produced commercially in large quantity. Also, in these patented processes, the catalysts were apparently tested for only a short time.

Based on the above catalyst development activity and inferior results, it is apparent that to provide a direct catalytic hydrogen peroxide process that is commercially feasible, it is necessary to modify the noble metal structure of the catalyst so that its activity at low hydrogen coventration and partial pressure remains substantial, and also so that the catalyst is stable over sufficiently long periods of time essential for successful commercial production operations.

SUMMARY OF INVENTION

This invention provides an improved particulate supported noble metal catalyst which is very useful for direct catalytic production of hydrogen peroxide ($H_2O_2$) product from hydrogen and oxygen containing feedstreams, and also provides a direct hydro peroxide production process utilizing the catalyst. The catalyst is formed by utilizing a colloid solution of a suitable active noble metal and a control ionic polymer for dispersing atoms of the active metal component onto a particulate support material having a critical large surface area. This catalyst not only utilizes the active noble metal being in highly dispersed minute crystal form on the support material, but also has controlled exposition of the crystal phase(s) of the noble metal on the support by utilizing the controlling ionic polymer in a critical molar ratio of the noble metal to the polymer in the broad range of 1:0.1 to 1:10 depending on the molecular weight of the polymer. The selective exposition of specific desired crystal phases or faces of the noble metal on the support has been found to be a critical factor for improvement of the catalyst and its activity and product selectivity for directly producing the hydrogen peroxide product, because the hydrogen-oxygen catalytic reaction is sensitive to the exposed phase(s) of the minute noble metal crystal particles in the catalyst. The resulting catalyst untilizing a phase controlled noble metal crystal practical has high catalytic activity and product selectivity, which permits the use of lower safe hydrogen concentrations (below LEL 4% relative) to the oxygen or to the air in the feedstream for making hydrogen peroxide product.

Suitable catalyst support materials include alumina, activated carbon, carbon black and silica powders having particle size of 5–1,000,000 nanometers (nm) and preferably 15–1000 nanometers (nm) and surface area of 50–500 $m^2/gm$, with carbon black being preferred. Noble metals which are useful for this catalyst include palladium (Pd), platinum (Pt), gold (Au), iridium (Ir), osmium (Os), rhodium (Rh), or ruthenium (Ru), and combinations thereof with the preferred metals being palladium and platinum. Useful broad percentage concentration for the noble metal in the catalyst is 0.1–10 wt. %, with 0.2–5 wt. % range usually being preferred. The noble metal minute crystals each have a particle size of 1–100 nanometers(nm). Suitable ionic polymers should be either negatively charged or have a lone pair of electrons that can attract the metal positively charged ions such as $Pd^{2+}$, and also have molecular weights within the range of about 300–8000 and preferably 600–6000. Example of suitable polymers include polyacrylates, polyvinylbenzoates, polyvinyl sulfate, polyvinyl sulfonates, polybiphenol carbonates, polybenzimidozoles, and polypyridines, and other polymer agents having similar molecular structures. The desired molar ratio of the noble metal to the polymer is generally dependent on the molecular weight of the polymer, with the higher range ratios being required for those polymers having higher molecular weights.

The catalyst of this invention which provides for the direct synthesis of hydrogen peroxide ($H_2O_2$) product from hydrogen and oxygen-containing feedstreams has minute particles of the noble metal such as palladium deposited as crystals having a critical phase or phases on the support material having selected critical surface area of 50–500 $m^2/gm$, such as activated carbon or carbon black. The desired noble metal phase exposition or structure for this catalyst is formed by utilizing the controlling ionic polymer, for example sodium polyacrylate in the critical ratio with the active noble metal such as palladium (Pd), so as to disperse the active metal atoms and control the metal particle crystal phase exposition and shape for the catalyst. The different crystal phases of the noble metal in the catalyst are selectively exposed by controlling the molar ratio of concentration of the metal atoms to the concentration of the control ionic polymer within a preferred critical range of 1:0.5 to 1:5. Such ratio control is a critical factor for the shape-control synthesis of the catalyst, because this ratio mainly determines the growing of different crystal phases of the metal atoms such as palladium on the support material. The growth rate of each crystal phase of the noble metal such such as palladium is related to the number of control polymer molecules surrounding the palladium ion. A study showed that by using this control polymer method for making the catalyst, the resulting phase-controlled noble metal catalyst for reaction of hydrogen with oxygen-containing feedstreams improves the selectivity for hydrogen peroxide product up to about 100%. This is a significant improvement when compared to the selectivity of only about 64% for catalysts having uncontrolled Pd exposition under similar reaction conditions.

Tests have indicated that the supported noble metal phase-controlled catalyst prepared according to this invention is active even with hydrogen-oxygen feedstreams containing only about 3.0 vol. % hydrogen, for advantageously producing hydrogen peroxide ($H_2O_2$) product at a selectivity exceeding 95% for a duration period of at least about 50 hours and probably much longer. Under similar process conditions, catalysts prepared by other methods have been less active and exhibit lower selectivity for the hydrogen peroxide product. The support materials useful in preparing catalysts made according to this invention are commercially available alumina, activated carbon with carbon black being preferred, carbon black, or silica which are widely available and have modest cost.

DESCRIPTION OF INVENTION

When hydrogen encounters oxygen, the thermodynamically favorable reaction product is water (equation 1). Hydrogen peroxide is an intermediate product and its further reaction within another hydrogen molecule leads to the formation of water (equations 2 and 3). Hydrogen peroxide is not a stable product, and upon its decomposition water and oxygen are released (equation 4).

$$2H_2 + O_2 = 2H_2O \tag{1}$$

$$H_2 + O_2 = H_2O_2 \tag{2}$$

$$H_2O_2 + H_2 = 2H_2O \tag{3}$$

$$2H_2O_2 = 2H_2O + O_2 \tag{4}$$

Because hydrogen peroxide is an intermediate product of the thermodynamically favorable reaction to water, it is critical to control catalytically the reaction between hydrogen and oxygen to selectively form the hydrogen peroxide product, otherwise water will be produced as the final product.

Figure 1:
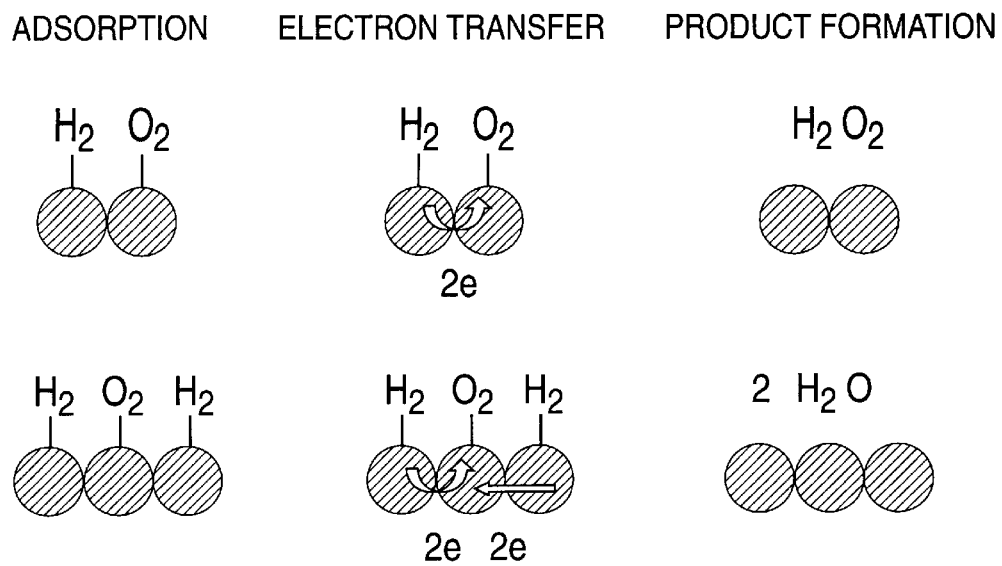
FIG. 1 is a schematic representation of various catalytic reactions of hydrogen and oxygen molecules with with active metal atoms of a catalyst for direct production of hydrogen peroxide ($H_2O_2$) product and water ($H_2O$)

For a catalyst, an active noble metal such as palladium plays two critical roles during the reaction between hydrogen and oxygen feeds. Specifically, the palladium adsorbs molecular hydrogen and oxygen by its atoms exposed on the catalyst surface; and it helps the electron transfer between hydrogen and oxygen. As shown schematically in FIG. 1a, one hydrogen molecule and one oxygen molecule adsorb on the two palladium atoms adjacent to each other. The electronegativity of oxygen tends to attract two electron from hydrogen. However, the electron transfer from hydrogen to oxygen can be accomplished only through the palladium metal atoms due to its high electronic conductivity. After the electrons are transferred, an ionic action between $H_2^{2+}$ and $O_2^{2-}$ results in a hydrogen peroxide molecule. However, when two molecules of hydrogen and one molecule of oxygen are adsorbed on three adjacent palladium atoms, the transfer of electrons from hydrogen to oxygen will lead to the formation of two molecules of water (FIG. 1b).

As described above, the formation of hydrogen peroxide product needs the adsorption of one hydrogen molecule and one oxygen molecule on two adjacent palladium atoms. Meanwhile, the formation of water needs the adsorption of two hydrogen molecules and one oxygen molecule on three adjacent palladium atoms. It is expected that if an oxygen molecule is adsorbed on a palladium atom that is dispersed on the catalyst so as to have less adjacent palladium atoms, the probability of water formation is reduced. This means that if a catalyst surface is configured to expose less adjacent palladium atoms to a hydrogen-oxygen feedstream, the chance to catalyze water formation is much less than that catalyst surface which exposes more adjacent palladium atoms.

Figure 2:
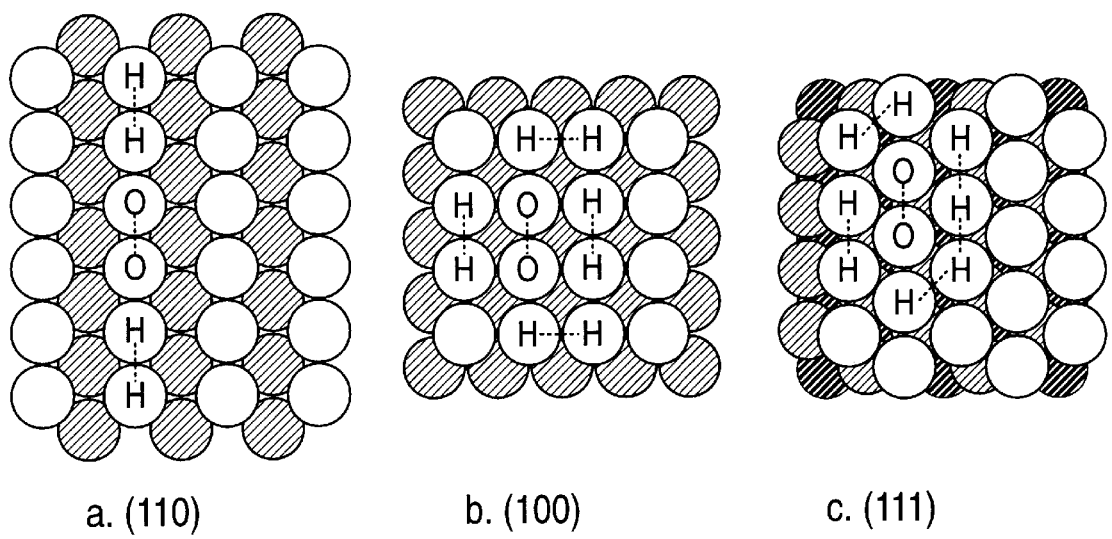
FIG. 2 shows a schematic comparative representation of different catalyst surface structures each having a different palladium (Pd) crystal phase, and the crystal phase 110 having a linear alignment of metal atoms on the crystals (FIG. 2a), which is considered most useful for the catalyst.

The surface structure of a catalyst having different crystal phases of active metal(s) such as palladium catalyst is shown schematically in FIG. 2. For phase 110 shown by FIG. 2a, each palladium atom has only two adjacent atoms; but there are more surrounding atoms on both the phase 100 (4 atoms) per FIG. 2b, and the phase 111 (6 atoms) per FIG. 2c. The probability of undesired water formation on phase 110 is one third of that on phase 100, and one fifth of that on phase 111. Thus, for selective formation of hydrogen peroxide product, the catalyst must expose as much as possible of the Pd phase 110 or the similar phases 220, 300, 440 etc. Other Pd phases (100 and 111) provide the possibility of adsorbing several hydrogen molecules on the atoms adjacent to that adsorbed oxygen. Thus, the probability of water formation is significantly enhanced on these other Pd phases.

The exposition of each desired crystal phase or face of active noble metal such as palladium is principally controlled by the molar ratio of the palladium to a controlling polymer. It is also affected by other organo-metal solution properties such as pH, viscosity, ionic strength, and temperature. These parameters have been studied selectively to optimize the exposition of the desired palladium crystal phase. To achieve the high catalytic activity and selectivity for formation of hydrogen peroxide product, the noble metal and the control polymer such as palladium-polyacrylate precursor is dispersed on a support material having critical large surface area of 50–500 m²/g, such as activated carbon or carbon black. By utilizing this colloid precursor control procedure, the 0.1–10 wt % noble metal is controllably deposited on the support material particles as a wide distribution of minute crystals each having a size of 1–100 nm and so that at least some and preferably most of the noble metal crystals have a desired phase 110 and/or 220 exposition. The activity of selected phase-controlled noble metal catalysts is confirmed using a continuously stirred tank reactor (CSTR) system.

Catalyst Preparation Methods

For making the catalyst of this invention, a controlling precursor solution of an active noble metal and an ionic polymer is utilized to disperse atoms of the active noble metal component such as palladium on a support material having of 5–1000 μm and critical surface area of 50–500 m²/g, such as carbon black. This method not only makes a catalyst having highly dispersed minute particles of active metal such as palladium on the support material, but also beneficially controls the exposition of the crystal phases of the palladium crystals on the support particles. The resulting catalyst has high activity which allows use of reduced safe hydrogen feed concentrations (below LEL 4.1%) in air. The selective exposition of different metal crystal phase(s) on the catalyst is critical for improvement in selectivity to form the hydrogen peroxide product, as the catalytic reaction is sensitive to the catalyst metal phase. The support materials useful in preparing the catalyst are commercially available alumina, activated carbon, carbon black, or silica which have modest cost within $1 to $5 per pound.

The catalysts of this invention are prepared by providing the controlling precursor solution which contains a dissolved noble metal salt such as palladium chloride and negatively charged ionic water soluble control polymer having molecular weight of 300–8000, such as sodium polyacrylate having molecular weight of about 1200. Suitable control polymers should have a preferred molecular weight within the range of 600–6000 and be water soluble, and when combined with a salt of a selected noble metal such as palladium together with a minor amount of a platinum salt useful as an alloying agent and a support particles such as carbon black, will provide a desired alignment of the metal atoms so as to form crystals and provide metal particle size of 1–100 nm and phase control for the desired exposition of the metal crystals on the support. For palladium, a small percentage of a third metal salt dilute solution such as platinum chloride is added form a metal alloy reduce its solubility in the acid solution and prevent leaching the active metal from the support.

For making the catalyst samples, the desired amount of palladium chloride (Pd $Cl_2$) was dissolved in a 0.4% hydrochloric acid (HCl) to form a first solution, and a second solution of the sodium polyacrylate in aqueous solution was added to the first solution to provide a metal to ionic polymer molar ratio of 1:0.5–1:1.5. Then a third solution of platinum chloride solution was added to provide a palladium to platinum weight ratio in a range of 20:1 to 100:1. The combined solution was then purged with 100 ml/min nitrogen flow for 1 hour, and then reduced by 100 ml/min hydrogen for 20 minutes, and the palladium-sodium polyacrylate precursor solution is formed. The precursor material is mixed with the selected carbon black catalyst support powder so that the support is impregnated with the precursor solution. After the catalyst sample was dried overnight, the metal was further reduced in hydrogen at temperature of 250–350° C. for 10 20 hours and the polymer removed, thereby leaving the metal crystal in a 110 and/or 220 phase exposition. The final catalyst should preferably have a palladium loading between about 0.5 to 0.7 wt. %.

The parameter that greatly affects the catalyst activity is the molar ratio of noble metal such as palladium to the control polymer, which ratio should preferably be between 1:0.5 and 1:5, and more preferably be in the range of 1:0.8 to 1:2. Desirable catalyst support materials may be selected from activated carbon or carbon black, and should have 5–1000 μm micrometers (μm) (nm) and total surface area of 140–500 m²/g, and preferably size μm and 200–450 m²/g surface area.

Process for Hydrogen Peroxide Production

Figure 3:
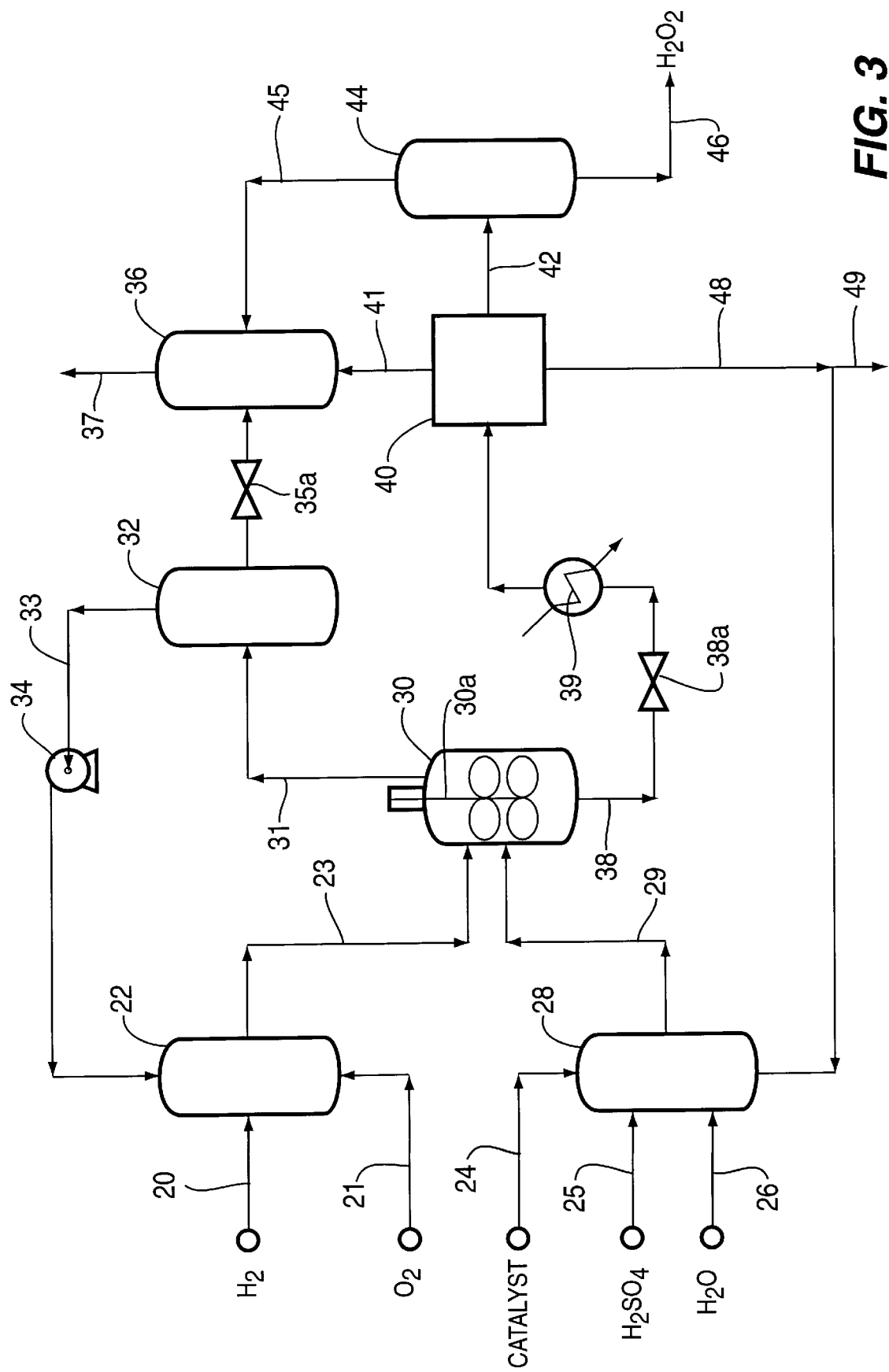
FIG. 3 shows a schematic flowsheet of a process for producing hydrogen peroxide ($H_2O_2$) product directly from gaseous hydrogen and oxygen feedstreams by utilizing the catalyst of this invention.

The catalyst material of this invention can be advantageously used in a process for direct catalytic production of hydrogen peroxide ($H_2O_2$) product from feedstreams of hydrogen and an oxygen-containing gas such as air. As shown in FIG. 3, the hydrogen gas feed is provided at 20, oxygen gas is provided at 21, the two feedstreams are each pressurized to reaction pressure and then premixed together at mixer 22 so that the hydrogen is maintained below its explosive limit of 4.1 vol % in the mixed feedstream, and passed as mixed gas stream 23 into a stirred reactor 30 lined with glass or a suitable non-reactive polymer material. Also, the catalyst material in fine powder form is provided at 24, and acid such as sulfuric acid ($H_2SO_4$) is provided at 25 for pH control, deionized water is provided at 26, and all are pressurized and then mixed together in mixer 28 to form a catalyst-aqueous liquid slurry.

This aqueous liquid slurry from the mixer 28 is passed as stream 29 to the stirred reactor 30 in which the gas feed streams 23 and slurry liquid stream 29 are thoroughly mixed together at reaction conditions. Useful reaction conditions maintained in the reactor 30 are 0–80° C. temperature, 500–3000 psig pressure and catalyst concentration of 1–40 gm catalyst/liter liquid for 0.2–6 hours residence time depending upon the mixing efficiency of the reactor, to produce a desired concentration of hydrogen peroxide product such as usually not exceeding about 20 vol %, with the product concentration being generally directly dependent on the reaction residing time. Preferred reaction conditions in reactor 30 are 30–50° C. temperature, 1000–2000 psig pressure, catalyst concentration of 5–25 gm catalyst/liter, and 1–4 hours residence time in the reactor. Proper mixing of the gaseous feedstream 23 and liquid slurry feedstream 29 in the reactor 30 can be accomplished either by utilizing a mechanical stirrer device 30a, or by a liquid recycle system utilizing a recycle pump (not shown).

From the reactor 30, a gas stream 31 is removed and passed to separator 32, from which a gas stream 33 containing dilute unreacted hydrogen and oxygen is recycled through compressor 34 back to the mixer 22. Also from separator 32, a purge gas stream 35 containing undesired inert gases is pressure-reduced at 35a and passed to a second mixer 36, from which gas stream 37 is vented to atmosphere.

Also from the reactor 30, a bottoms liquid stream 38 containing hydrogen peroxide and used catalyst is withdrawn, pressure-reduced at valve 38a, cooled at heat exchanger 39, and passed to a flash/filtration step at 40. Flashed gas is removed at 41 and passed to the mixer 36 while liquid removed at 42 is passed to a flash drum 44. From the flash drum 44, a desorbed vapor stream 45 is removed and also passed back to the mixer 36, from which a vent gas is disposed at 37 such as to a flare. Also from the flash drum 44, hydrogen peroxide liquid product is withdrawn at 46. Also from the gas/liquid/solids separation step at 40, used catalyst separated from the liquid such as by filtration is withdrawn at 48, and if desired can be recycled back to mixer 28 for reuse in the process. After the catalyst age in the reactor 30 reaches at least about 50 hours and usually 100–300 hours and becomes less active, a minor portion of the used catalyst withdrawn at 48 can be discarded at 49 and replaced by an equivalent amount of fresh catalyst at 24 to maintain desired high activity of the catalyst in the stirred reactor 30.

This invention will be described further by use of the following examples, which should not be construed as limiting the scope of the invention.

EXAMPLE No. 1

Several experimental screening runs were made with catalyst samples made utilizing various support materials to determine desired characteristics of effective support materials for an improved supported palladium catalyst useful for the direct production of hydrogen preoxide ($H_2O_2$) from hydrogen and oxygen feedstreams. The screening runs for the catalyst samples made in a stirred glass lined one-liter capacity autoclave unit, using as feed gases 1.9% hydrogen in air at reaction conditions of 35° C. temperature and 1000 psig pressure, with catalyst concentration of 10 grams catalyst per liter of liquid at feedgas rate of 1 liter/minute for 3 hours duration. The results are shown in Table 1 below.

TABLE 1

Catalyst Performance on Different Supports

| Support No. | Support Material | Surface Area, $m^2/g$ | $H_2O_2$ Concentration, wt. % |
|---|---|---|---|
| 1 | Carbon black | 1,500 | 0.1 |
| 2 | Activated carbon | 1,200 | 0 |
| 3 | Activated carbon | 1,000 | 0 |
| 4 | Activated alumina | 325 | 0.1 |
| 5 | Activated alumina | 200 | 0.3 |
| 6 | Carbon black | 200 | 1.6 |
| 7 | Carbon black | 140 | 1.4 |

From these results, it is seen that the support materials having surface area of 1000 $m^2/g$ or greater were inactive, apparently because of pore sizes being too small so that water condensation prevents hydrogen and oxygen gas from reaching the palladium active sites. Also, the catalyst samples supported on activated alumina did not provide good activity for hydrogen peroxide production, apparently because of interaction of palladium with the alumina provided weak adsorption of oxygen. The catalyst samples with carbon black support material having 140–200 $m^2/g$ surface area provided the most effective support material for the catalyst.

EXAMPLE No. 2

Because the molar ratio of palladium to the control ionic polymer sodium polyacrylate used in making the catalyst greatly affects catalyst activity, additional experimental runs were made using the carbon black catalyst support No. 6 from Example No. 1 to determine the effect of different ratios of palladium (Pd) to the control polymer for making the catalyst. These runs were made at reaction conditions of 45° C. temperature, 1,000 psig pressure, and 10 gm catalyst concentration per liter of liquid, at feed rate of 1 liter/minute of feed gas containing 3.0% hydrogen in air. The results are shown in Table 2 below.

TABLE 2

Effect of Pd to Polymer Ratio on Catalyst Activity

| Pd/Polymer Molar Ratio | $H_2O_2$ Concentration, wt. % | $H_2O_2$ Selectivity, wt. % |
|---|---|---|
| 1:0.5 | 2.7 | 63 |
| 1:1.0 | 3.3 | 93 |
| 1:2.5 | 0.2 | — |
| 1:5.0 | 0 | — |

From these results, it is seen that a catalyst utilizing a molar ratio of palladium to the sodium polyacrylate polymer of about 1:1 provided the best hydrogen peroxide product concentration and selectivity.

EXAMPLE No. 3

Other experimental runs were made at the reaction conditions of Example No. 2 on a catalyst having support No.

6 from Table 1 to determine the effect of catalyst concentration in the stirred one-liter capacity on $H_2O_2$ product selectivity and yield. The results are shown in Table 3 below.

TABLE 3

Effect of Catalyst Concentration in Medium

| Catalyst Concentration, g/liter | $H_2$ Conversion, wt. % | $H_2O_2$ Concentration, wt. % | $H_2O_2$ Selectivity, wt. % | $H_2O_2$ Yield, g/gPd/h |
|---|---|---|---|---|
| 5 | 7 | 1.1 | 100 | 124 |
| 10 | 15 | 2.3 | 100 | 131 |
| 20 | 24 | 2.9 | 83 | 83 |

From the above results, it is seen that hydrogen peroxide yield increased with increase catalyst concentration in the stirred reactor up to about 10 g/liter of liquid, while maintaining the product selectivity at 100%. But at higher catalyst concentration the hydrogen peroxide selectivity and yield decreased, apparently because too much catalyst in the reactor causes further oxidation of the hydrogen peroxide to form undesired water. Catalyst concentration in the stirred reactor of 5–10 gm catalyst/liter yielded the best results of product concentration, selectivity and yield.

EXAMPLE No. 4

Another series of experimental runs were made to determine the reaction conditions which produce the best product results. Runs were made at reaction temperatures of 35° C., 45° C. and 55° C. and at pressures of 1000–1800 psig. with 10 gm catalyst/liter concentration in the reactor 3 hour duration. The results are presented in Tables 4 and 5 below.

TABLE 4

Effect of Reaction Temperature

| Temperature, ° C. | H2 Conversion, wt. % | $H_2O_2$ Concentration, wt. % | $H_2O_2$ Selectivity, wt. % | $H_2O_2$ Yield, g/gPd/h |
|---|---|---|---|---|
| 35 | 15 | 2.3 | 100 | 131 |
| 45 | 25 | 3.3 | 93 | 189 |
| 55 | 38 | 3.8 | 71 | 219 |

TABLE 5

Effect of Reaction Pressure

| Pressure, Psig | $H_2$ Conversion, wt. % | $H_2O_2$ Concentration, wt. % | $H_2O_2$ Selectivity, wt. % | $H_2O_2$ Yield, g/gPd/h |
|---|---|---|---|---|
| 1000 | 25 | 3.3 | 93 | 189 |
| 1400 | 33 | 4.8 | 100 | 279 |
| 1800 | 34 | 5.2 | 100 | 304 |

From the above results, it is noted that while the hydrogen peroxide product yield increased temperature due to increased catalytic activity, the product selectivity decrease because the hydrogen peroxide began decomposing to form undesired water. Also, increased reaction pressure apparently increases solubility of the reactant gases and improves mass transfer to the catalyst active sites. Thus, the best operating conditions for the stirred reactor were at 35–45° C. temperature and 1400–1800 psig pressure, for catalyst on of 5–10 gm/liter and about 3 hour duration.

EXAMPLE No. 5

Further experimental runs were made in the stirred one-liter capacity autoclave unit at 2, 3 and 6 hours duration evaluate reaction time duration for each batch. Although longer reaction time accumulates the hydrogen peroxide product to greater concentrations, extended product exposure to the catalyst can result in over oxidation to form undesired water. The reaction time duration results are presented in Table 6 below.

TABLE 6

Effect of Reaction Time For Each Batch

| Reaction Time, hour | $H_2$ Conversion, wt. % | $H_2O_2$ Concentration, wt. % | $H_2O_2$ Selectivity, wt. % | $H_2O_2$ Yield, g/gPd/h |
|---|---|---|---|---|
| 2 | 31 | 2.9 | 100 | 249 |
| 3 | 33 | 4.8 | 100 | 279 |
| 6 | 34 | 9.1 | 99 | 276 |

From these results, it is seen that the catalyst has high selectivity for hydrogen peroxide product, and its concentration and yield increased up to about 6 hours time duration in the autoclave reactor with no significant decomposition of the hydrogen peroxide product.

EXAMPLE No. 6

Figure 4:
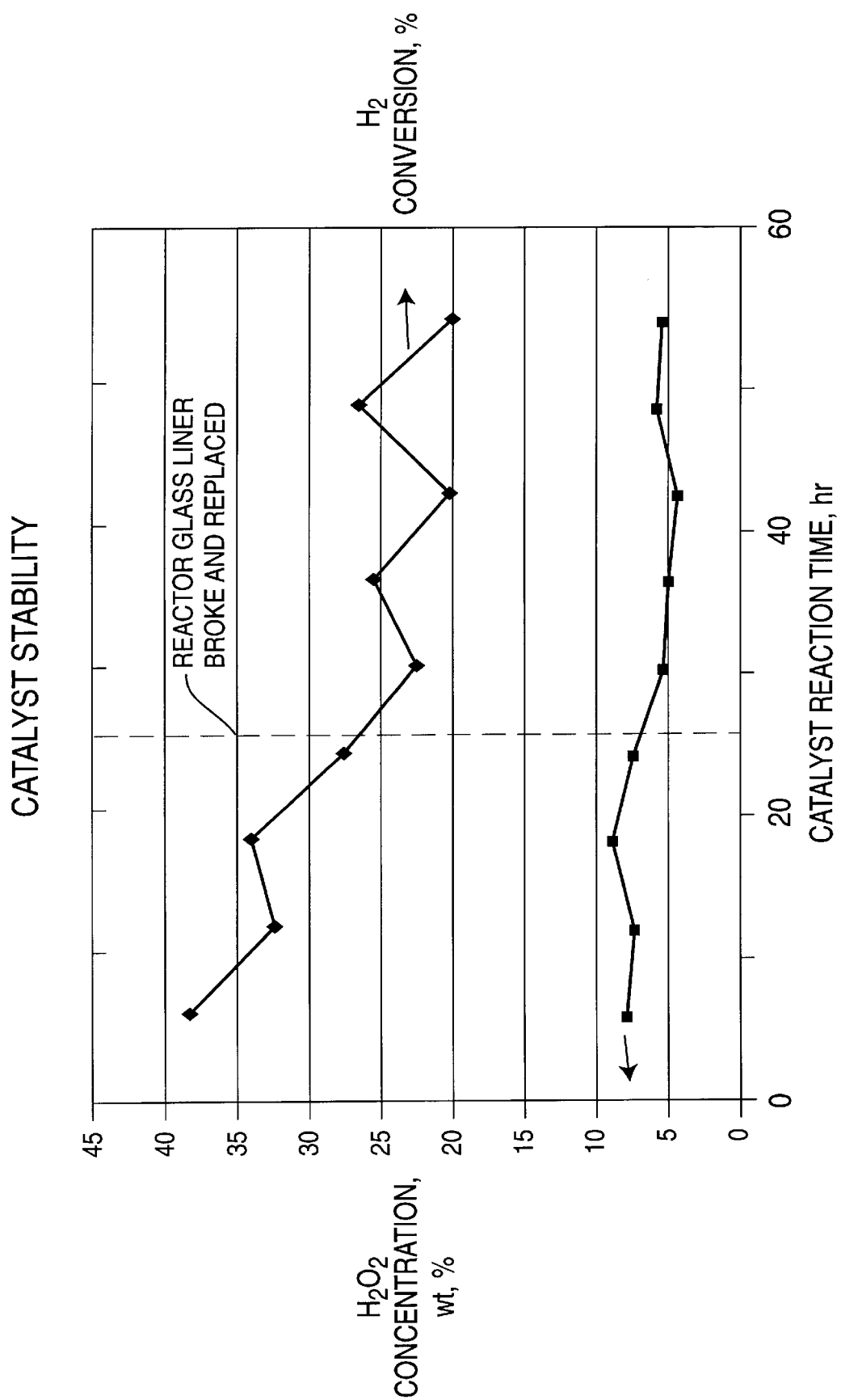
FIG. 4 is a graph showing percent hydrogen conversion and hydrogen peroxide product concentration plotted vs. reaction time duration for the catalyst in a stirred catalytic reactor.

A simulated catalyst stability test was performed. on catalyst having support No. 6 in Table 1, using the stirred autoclave unit at the conditions of Example 2. Because the reactor liquid phase was not a continuous flow mode as would be utilized in a commercial process, the reaction was stopped at successive 6-hour intervals and the hydrogen peroxide concentration of the reactor liquid was determined by analyses. During the fifth such test the autoclave reactor glass liner was inadvertently broken, which resulted in contamination of the catalyst by exposure to dissolved metal ions from the stainless steel reactor, as it is known that exposure to Cr and Fe favors decomposition of hydrogen peroxide. Results of this catalyst stability test during nine successive 6-hour runs is shown in FIG. 4, in which percent hydrogen conversion and hydrogen peroxide concentration are plotted vs. reaction time duration in the reactor.

From these results, it is noted that the hydrogen conversion declined somewhat during the first four 6-hour run intervals and the hydrogen peroxide concentration remained essentially constant at about 8 wt. % for 24 hours duration. For the final five 6-hour runs, the hydrogen peroxide product concentration remained generally constant at 5–6 wt. % for an additional 30 hours duration. Based on these data, it appears that the catalyst activity remained generally constant for a total of about 56 hours. Thus the hydrogen conversion and hydrogen peroxide concentration data indicate that the catalyst useful life is at least about 56 hours, and is probably significantly longer such as up to about 500 hours.

Although this invention has been described broadly and also in terms of preferred catalyst composition, method for making the catalyst and process reaction conditions, it is understood that modifications and variations can be made all within the scope as defined by the claims.

We claim:

1. A supported noble metal catalyst for direct catalytic production of hydrogen peroxide ($H_2O_2$) from hydrogen and oxygen-containing feedstreams, the catalyst comprising:

a particulate support material having total surface area of 50–500 m$^2$/gm; and 0.1–10 wt. % noble metal controllably deposited on said particulate support material, said noble metal having a wide distribution of minute crystals each having size of 1–100 nm on said particulate support so that at least most of the noble metal crystals have a phase of 110 and/or 220 exposition which has atoms of the noble metal exposed in an orderly linear alignment pattern on the metal crystals, and wherein said noble metal is palladium in combination with platinum, gold, iridium, osmium, rhodium, or ruthenium, or combinations thereof.

2. The catalyst of claim 1, wherein said support material is carbon black having total surface area of 100–250 m$^2$/gm.

3. The catalyst of claim 1, wherein said palladium has a concentration of 0.2–5 wt. % on the catalyst.

4. The catalyst of claim 3, wherein sufficient platinum is added to provide a palladium to platinum weight ratio within a range of 20:1 to 100:1.

5. The catalyst of claim 1, wherein substantially all of said widely dispersed minute noble metal crystals have a phase 110 and/or 220 exposition.

6. A supported noble metal catalyst for direct catalytic production of hydrogen peroxide ($H_2O_2$) product from hydrogen and oxygen-containing feedstreams, the catalyst comprising:
   a particulate carbon black support material having total surface area of 100–250 m$^2$/gm; and
   0.2–5 wt % palladium controllably deposited on said particulate support material so as to provide a wide distribution of multiple minute palladium metal crystals each having particle size of 10–50 nm and being widely dispersed on said support material with at least most of the palladium crystals having a phase 110 and/or 220 exposition, and which has atoms of the palladium metal exposed in an orderly linear alignment pattern on the palladium crystals.

7. A method for making a supported metal catalyst for direct catalytic production of hydrogen peroxide ($H_2O_2$) product from hydrogen and oxygen-containing feedstreams, comprising the steps of:
   (a) providing a first solution containing a salt of a noble metal including palladium(Pd) in combination with platinum(Pt), gold(Au), iridium(Ir), osmium(Os), rhodium(Rh), or ruthenium(Rh), or and combinations thereof dissolved in a dilute acid;
   (b) providing a second solution of an ionic control polymer dissolved in water, said control polymer having molecular weight of 300–8000;
   (c) mixing said first and second solutions together and forming a combined controlling precursor solution, the molar ratio of the first solution metal to the second solution polymer being in range of 1:0.1 to 1:10, and then reducing the precursor solution with hydrogen;
   (d) mixing the combined precursor solution with a particulate support material having 50–500 m$^2$/g surface area, and impregnating said particulate support material with the combined precursor solution so as to provide an orderly dispersed metal crystal structure on the support material; and
   (e) drying the metal impregnated particulate support material and then reducing it with hydrogen gas at 250–350° C. temperature for 10–20 hours to make the catalyst having active minute noble metal crystals provided in an atomic structure of 110 and/or 220 phase exposition.

8. The method for making a supported metal catalyst according to claim 7, wherein the first solution noble metal salt is palladium chloride (Pd Cl$_2$), and the second solution ionic control polymer is sodium polyacrylate.

9. The method for making a supported metal catalyst according to claim 8, wherein a third solution of a platinum salt is mixed with said first and second solutions before mixing the combined solutions with the support material powder for forming an alloy which prevents leaching the active noble metal from the support material.

10. The method for making a supported metal catalyst according to claim 9, wherein the platinum salt is hydrogen hexachloroplatinate (H$_2$ Pt Cl$_6$) sufficient to provide a palladium to platinum weight ratio in the range of 20:1 to 100:1.

11. The method for making a supported metal catalyst according to claim 7, wherein said ionic control polymer has a molecular weight of 600–6000.

12. A method for making a supported metal catalyst for direct catalytic production of hydrogen peroxide ($H_2O_2$) product from hydrogen and oxygen-containing feedstreams, comprising the steps of:
   (a) providing a first solution containing palladium chloride (Pd Cl$_2$) dissolved in dilute hydrochloric acid (HCl);
   (b) providing a second solution of sodium polyacrylate ionic control polymer dissolved in water, the molar ratio of said first solution metal to the second solution polymer being in a range between 1:0.5 and 1:5;
   (c) providing a third solution containing a platinum salt;
   (d) mixing said first, second and third solutions together and forming a combined controlling precursor solution, reducing the combined precursor solution with hydrogen at 10–40° C. temperature, then mixing the combined precursor solution with carbon black support material powder having 100 250 m$^2$/g surface area and impregnating said support material with the precursor solution; and
   (e) drying the metal impregnated carbon black support material and then reducing it with hydrogen gas at 250–350° C. temperature for 12–18 hours to make the catalyst having palladium metal crystals oriented so as to provide a 110 and/or 220 phase exposition, and which has atoms of the palladium exposed in an orderly linear alignment pattern on the metal crystals.

13. A direct catalytic process for producing hydrogen peroxide product from hydrogen and oxygen-containing feedstreams, comprising the steps of:
   (a) providing a hydrogen gas and an oxygen-containing gas feedstream, with the hydrogen concentration in the feedstream being below its explosive limit; and mixing the two feedstreams together to form a combined gas feedstream;
   (b) forming an aqueous liquid slurry with a particulate catalyst as defined by claim 1, said aqueous liquid-catalyst slurry having a catalyst concentration of 1–40 gm catalyst/liter of slurry; and mixing the combined hydrogen and oxygen-containing gas feedstream with the aqueous liquid-catalyst slurry;
   (c) reacting the aqueous liquid slurry in a stirred reactor at reaction conditions of 0–80° C. temperature and 500–3000 psig. pressure for 0.2–6 hours residence time, and forming hydrogen peroxide product;
   (d) removing a hydrogen-containing gas from the stirred reactor and withdrawing a bottoms liquid stream containing hydrogen peroxide ($H_2O_2$) liquid product together with used catalyst; and
   (e) separating the hydrogen peroxide liquid product from the used catalyst in a gas-liquid-solid separation step, and withdrawing the hydrogen peroxide product from the process.

14. The hydrogen peroxide production process of claim 13, wherein the catalyst concentration in the reactor is 5–20 gm/liter.

15. The hydrogen peroxide production process of claim 13, wherein the reaction condition are maintained at 20–50° C. temperature and 1000–2000 psig pressure for 0.5–4 hour residence time.

16. The hydrogen peroxide production process of claim 13, including purifying the hydrogen-containing gas removed from the reactor and recycling a purified hydrogen gas stream back to the reactor step (c).

17. The hydrogen peroxide production process of claim 13, including separating the hydrogen peroxide liquid product from the reactor bottom liquid by a filtration step for removing the used catalyst.

18. The hydrogen peroxide production process of claim 13, including recovering used catalyst from the gas-liquid-solid separation step and recycling the catalyst back to the catalyst mixing step (b).

19. The hydrogen peroxide production process of claim 13, in which the hydrogen and oxygen-containing feedstreams are introduced into the reactor continuously, and the hydrogen peroxide product is withdrawn continuously.

20. The hydrogen peroxide production process of claim 18, wherein the catalyst age in the reactor is maintained at 100–500 hours.

21. A direct catalytic process for producing hydrogen peroxide ($H_2O_2$) product from hydrogen and oxygen-containing feedstreams, comprising the steps of:

(a) providing separate hydrogen gas and oxygen-containing gas feedstreams with the hydrogen concentration being below its explosive limit in oxygen, and mixing the two feedstreams together and forming a combined gas feedstream;

(b) forming an aqueous liquid slurry with a fine sized particulate catalyst as defined by claim 1, said aqueous liquid-catalyst slurry having a catalyst concentration of 5–25 gm catalyst/liter of slurry; and mixing the combined hydrogen and oxygen-containing gas feedstream together with the aqueous liquid-catalyst slurry;

(c) reacting the aqueous liquid slurry in a stirred reactor at reaction conditions of 20–50° C. temperature and 1000–2000 psig. pressure for 0.5–4 hours residence time, and forming hydrogen peroxide product;

(d) continuously removing a hydrogen-containing gas from the stirred reactor and withdrawing a bottoms liquid stream containing the hydrogen peroxide ($H_2O_2$) liquid product and used catalyst; and (e) separating the hydrogen peroxide liquid product from the used catalyst in a gas-liquid-solids separation step, withdrawing the hydrogen peroxide product, and recycling the used catalyst back to the catalyst mixing step (b).

* * * * *

UNITED STATES PATENT AND TRADEMARK OFFICE
CERTIFICATE OF CORRECTION

PATENT NO. : 6,168,775 B1
DATED : January 2, 2001
INVENTOR(S) : Zhou et al.

It is certified that error appears in the above-identified patent and that said Letters Patent is hereby corrected as shown below:

Title page,
Item [54], Title, change "CATALYSTIC" to -- CATALYTIC --.
Item [56], References Cited, U.S. PATENT DOCUMENTS, add:
-- 4,661,337   4/1987   W.F. Brill
   4,681,751   7/1987   Gosser
   4,772,458   9/1988   Gosser et al.
   4,832,938   5/1998   Gosser et al.
   5,236,692   8/1993   Nagashima et al.
   5,378,450   1/1995   Tomita et al.
   5,338,531   8/1994   Chuang et al.
   5,399,334   3/1995   Kawakami et al. --.
Item [57], ABSTRACT,
Line 2, change "50µ500" to -- 50-500 --.

Column 2,
Line 11, change "decently" to -- directly --.
Line 41, change "deceased" to -- decreased --.
Line 60, change "hydro" to -- hydrogen --.

Column 3,
Line 12, before "catalyst" insert -- particulate --.
Line 12, change "untilizing" to -- utilizing --.
Line 12, before "phase controlled" remove "a".
Line 13, change "practical" to -- particles --.
Line 15, change "(below LEL 4% relative)" to -- (below LEL 4%) relative --.
Line 35, change "Example" to -- Examples --.

Column 4,
Line 18, after "peroxide" insert -- ($H_2O_2$) --.
Lines 20-21, after "actved carbon" remove "with carbon black being preferred".
Line 22, after "modest cost" insert -- with carbon black being preferred --.
Line 26, after "oxygen molecules" remove first occurrence of "with".

Column 5,
Line 11, after "ionic" change "action" to -- reaction --.

Column 6,
Line 3, remove "of 5-1000 µm and".
Line 33, before "form" insert -- to --.
Lines 33 and 34, after "prevent leaching" insert -- of --.
Line 51, change "10 20 hours" to -- 10-20 hours --.

UNITED STATES PATENT AND TRADEMARK OFFICE
CERTIFICATE OF CORRECTION

PATENT NO. : 6,168,775 B1
DATED : January 2, 2001
INVENTOR(S) : Zhou et al.

It is certified that error appears in the above-identified patent and that said Letters Patent is hereby corrected as shown below:

Column 8,
Line 5, after "catalyst samples" insert -- were --.
Line 6, change "autocalve" to -- autoclave --.

Column 9,
Line 30, after "reactor" insert -- for --.
Line 56, before "temperature" insert -- at increased --.
Line 57, after "selectivity" change "decrease" to -- decreased --.
Line 63, after "catalyst" change "on" to -- concentration --.

Column 10,
Line 1, before "evaluate" insert -- to --.
Line 26, after "performed" remove ".".
Line 44, change "intervals" to -- intervals, --.
Line 48, change "these data," to -- this data, --.

Column 12,
Line 31, change "100 250" to -- 100-250 --.

Column 13,
Line 5, change "condition" to -- conditions --.

Signed and Sealed this

Twentieth Day of December, 2005

JON W. DUDAS
*Director of the United States Patent and Trademark Office*